(12) United States Patent
Tai et al.

(10) Patent No.: US 9,664,840 B2
(45) Date of Patent: May 30, 2017

(54) LIGHT EMITTING MODULE AND DISPLAY DEVICE

(71) Applicant: E Ink Holdings Inc., Hsinchu (TW)

(72) Inventors: Sheng-Chieh Tai, Hsinchu (TW);
I-Jeng Chen, Hsinchu (TW); Hsin-Tao Huang, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 25 days.

(21) Appl. No.: 14/833,131

(22) Filed: Aug. 23, 2015

(65) Prior Publication Data

US 2016/0131814 A1    May 12, 2016

Related U.S. Application Data

(60) Provisional application No. 62/078,433, filed on Nov. 12, 2014.

(30) Foreign Application Priority Data

Feb. 5, 2015 (TW) .............................. 104103875 A

(51) Int. Cl.
*F21V 8/00* (2006.01)
(52) U.S. Cl.
CPC ......... *G02B 6/0073* (2013.01); *G02B 6/0023* (2013.01); *G02B 6/0091* (2013.01); *G02B 6/0013* (2013.01)
(58) Field of Classification Search
CPC .............................. G02B 6/0011; G02B 6/0073
(Continued)

(56) References Cited

U.S. PATENT DOCUMENTS 8,129,740 B2    3/2012  Choi et al.
8,687,142 B2    4/2014  Lee et al.
(Continued)

FOREIGN PATENT DOCUMENTS

CN    102287709    12/2011
JP    2011100724    5/2011
(Continued)

OTHER PUBLICATIONS

Translation of TW 201104933, google.com, Nov. 12, 2016, pp. 1-30.*

(Continued)

*Primary Examiner* — Laura Tso
(74) *Attorney, Agent, or Firm* — Jianq Chyun IP Office

(57) ABSTRACT

A light emitting module is provided. A light emitting unit includes a light emitting surface including a middle light emitting area and a peripheral light emitting area. The peripheral light emitting area is disposed on the opposite sides of the middle light emitting area. The light emitting unit emits light from the light emitting surface. A light guide plate includes a light incident surface adjacent to the middle light emitting area. The width of the light incident surface in a direction is smaller than the width of the light emitting surface in the direction, and the light incident surface is configured to receive part of the light that is emitted from the middle light emitting area, and another part of the light that is emitted from the peripheral light emitting area deviates from the light incident surface. A display device is also provided.

9 Claims, 3 Drawing Sheets

(58) Field of Classification Search
USPC .......................................... 362/611, 612, 613
See application file for complete search history.

(56) References Cited

U.S. PATENT DOCUMENTS

| | | | |
|---|---|---|---|
| 8,692,954 B2 | 4/2014 | Lee et al. | |
| 2002/0175632 A1 | 11/2002 | Takeguchi | |
| 2010/0271841 A1 | 10/2010 | Kim | |
| 2012/0257409 A1 | 10/2012 | Huang et al. | |
| 2012/0294036 A1 | 11/2012 | Tang | |
| 2014/0146513 A1* | 5/2014 | Choi | G02F 1/133308 362/19 |
| 2015/0002782 A1* | 1/2015 | Kim | G02B 6/0031 349/62 |

FOREIGN PATENT DOCUMENTS

| | | |
|---|---|---|
| TW | 201104933 | 2/2011 |
| TW | 201421002 | 6/2014 |
| WO | 2010058845 | 5/2010 |

OTHER PUBLICATIONS

"Office Action of Taiwan Counterpart Application", issued on Jul. 21, 2016, p. 1-p. 6.

* cited by examiner

LIGHT EMITTING MODULE AND DISPLAY DEVICE

CROSS-REFERENCE TO RELATED APPLICATION

This application claims the priority benefits of U.S. provisional application Ser. No. 62/078,433, filed on Nov. 12, 2014 and Taiwan application serial no. 104103875, filed on Feb. 5, 2015. The entirety of each of the above-mentioned patent applications is hereby incorporated by reference herein and made a part of this specification.

BACKGROUND OF THE INVENTION

1. Field of the Invention

The invention relates to a light source device and an electronic apparatus, and particularly relates to a light emitting module and a display device.

2. Description of Related Art

The main function of a light source module is to provide light for a display device. The basic principle thereof is to use a linear light source or a point light source and convert effective light into a surface light source having a high brightness and a preferable uniformity through a light guide plate. Generally speaking, the light source modules may be categorized into front light source modules and back light source modules. The front light source modules are mainly used in reflective displays, such as electrophoretic displays (EPDs) or reflective display media.

In the conventional front light module, light emitting diodes (LEDs) have been broadly used as the linear or point light source. A light beam emitted by the LEDs is more directional, and the conventional white light emitting diodes are usually formed by using blue light emitting diodes with yellow phosphors. Specifically, the blue light emitted by the blue light emitting diodes excites the yellow phosphors to emit yellow light, and the white light is presented by using the blue light with the yellow light. Thus, due to the high directionality and the needs to convert with the phosphors, the most preferable light is usually received from a position just in front of the light emitting surface of the white light emitting diode, and peripheral light of the light emitting surface usually has a lower color temperature, which makes the light beam entering the light guide plate not uniform, thereby reducing an overall quality of the front light module.

SUMMARY OF THE INVENTION

The invention provides a light emitting module. A light beam provided by the light emitting module has a uniform color and brightness.

The invention provide a display device capable of providing a preferable display image.

The light emitting module according to an embodiment of the invention includes at least one light emitting unit and a light guide plate. The light emitting unit includes a light emitting surface. The light emitting surface includes a middle light emitting area and two peripheral light emitting areas. The peripheral light emitting areas are disposed at opposite sides of the middle light emitting area. The light emitting unit emits a light beam from the light emitting surface. The light guide plate includes a light incident surface adjacent to the middle light emitting area. A width of the light incident surface in a direction is smaller than a width of the light emitting surface in the direction, the light incident surface receives a part of the light beam emitted from the middle light emitting area, and another part of the light beam emitted from the peripheral light emitting areas deviates from the light incident surface.

A display device according to an embodiment of the invention includes a display panel and the aforementioned light emitting module. The display panel includes a display surface. In addition, the light emitting module is disposed beside the display surface.

According to an embodiment of the invention, the light emitting surface exceeds the light incident surface in the direction.

According to an embodiment of the invention, the widths of the light emitting surface and the light incident surface in the direction meet $$1.1 \leq \frac{h}{t} \leq 2.5,$$

where h is the width of the light emitting surface in the direction, and t is the width of the light incident surface in the direction.

According to an embodiment of the invention, an interval is between a middle point of the light emitting surface in the direction and a middle point of the light incident surface in the direction, and the interval is smaller than or equal to (h−t)/2, where h is the width of the light emitting surface in the direction, and t is the width of the light incident surface in the direction.

According to an embodiment of the invention, the light emitting module further includes a flexible printed circuit board electrically connected to the at least one light emitting unit. The light guide plate further includes a first surface and a second surface. The light incident surface connects the first surface and the second surface. The flexible printed circuit board is connected to a part of the first surface through an adhesive layer.

According to an embodiment of the invention, the light emitting module further includes a light shielding layer. The at least one light emitting unit has a third surface connected to the light emitting surface adjacent to the second surface in the direction. The light shielding layer is adhered to a part of the second surface and the third surface through another adhesive layer, and a part of the light guide plate is located between the light shielding layer and the flexible printed circuit board.

According to an embodiment of the invention, the light emitting module is a front light module.

Based on the above, in the light emitting module according to the embodiments of the invention, the light guide plate receives the light beam from the middle light emitting area of the light emitting unit. Therefore, the light beam has a more uniform color and brightness, thereby making the light emitting module a preferable light source. With the light emitting module, the display device provided in the embodiments of the invention is able to use the preferable light source to provide a preferable image.

To make the above features and advantages of the invention more comprehensible, embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings

DESCRIPTION OF THE EMBODIMENTS

Figure 1A:
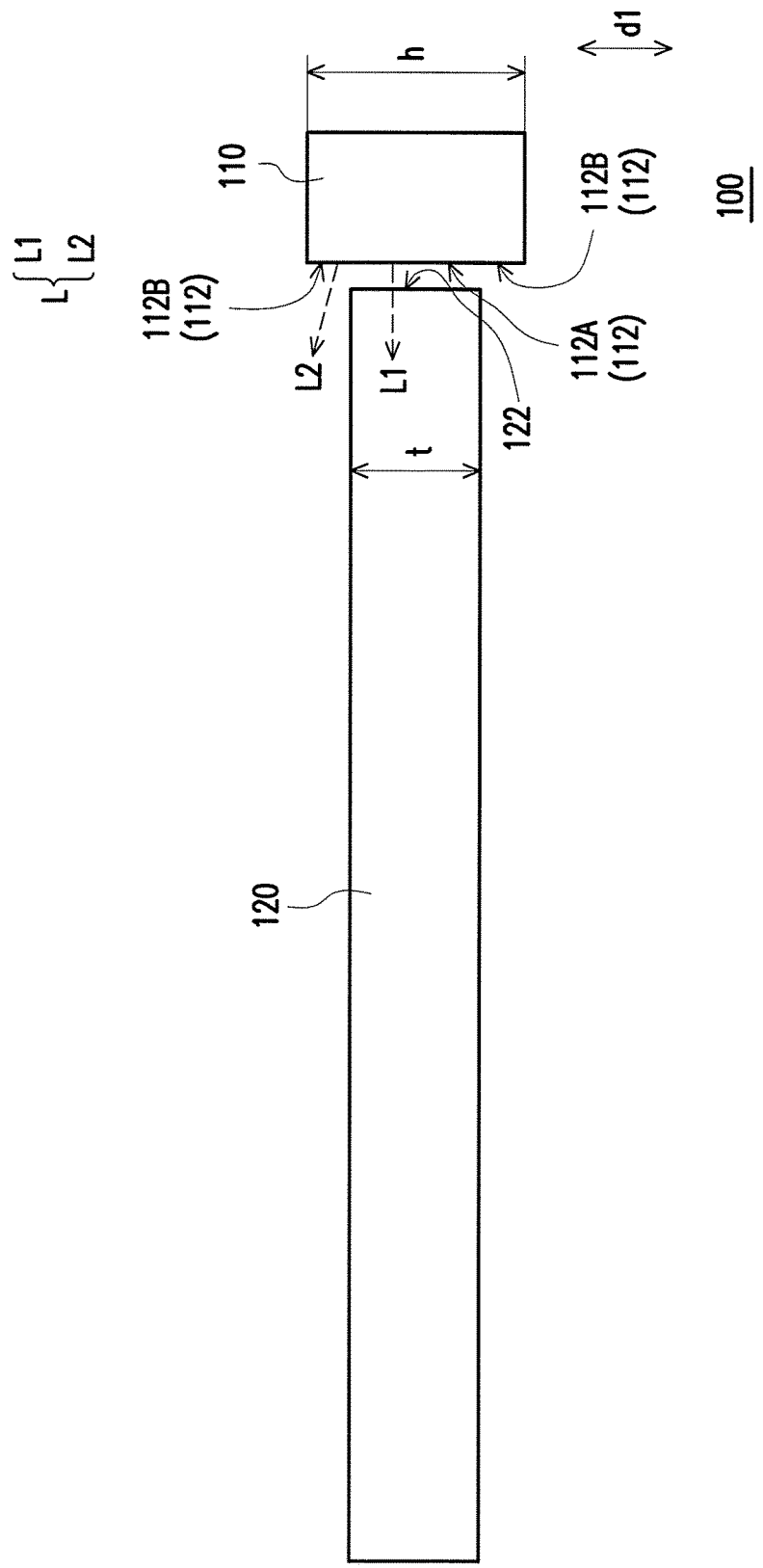
FIG. 1A is a cross-sectional view illustrating a light emitting module according to a first embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

Figure 1B:
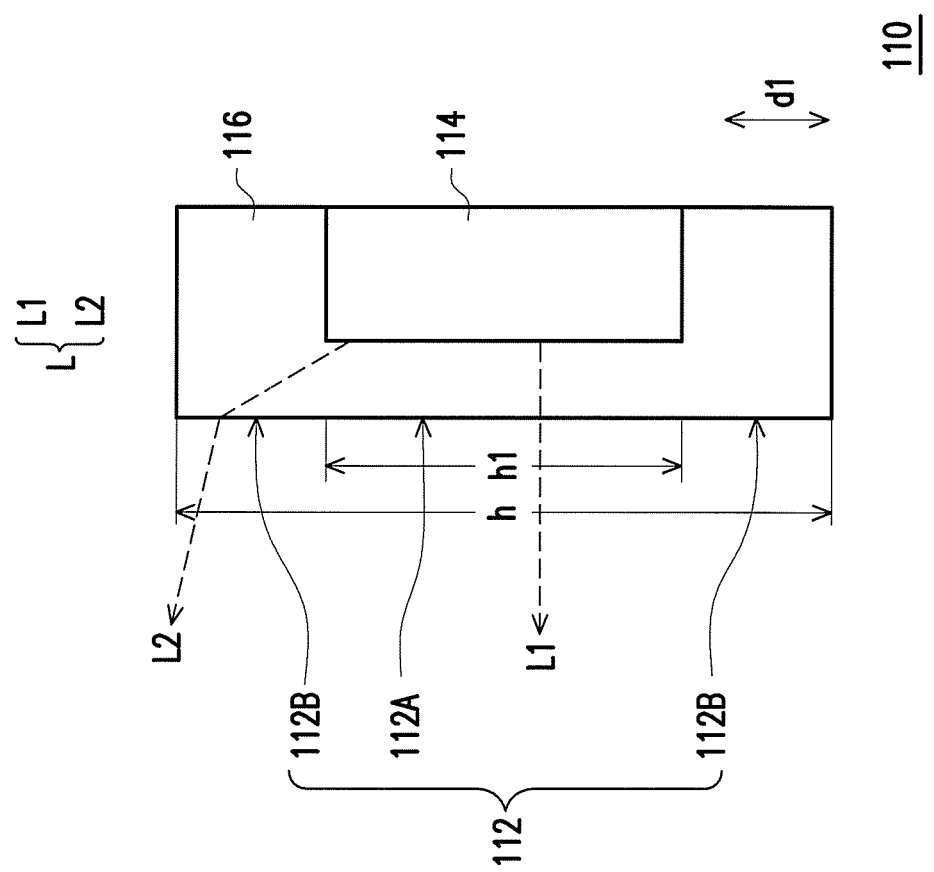
FIG. 1B is a schematic view illustrating a light emitting unit according to the first embodiment of the invention.

FIG. 1A is a cross-sectional view illustrating a light emitting module according to a first embodiment of the invention. FIG. 1B is a schematic view illustrating a light emitting unit according to the first embodiment of the invention. Contents of FIGS. 1A and 1B merely serve to illustrate relative relations of respective components. For the clearness of illustration, some components are enlarged. However, FIGS. 1A and 1B do not serve to limit sizes and positions of the components. Referring to FIGS. 1A and 1B, in the first embodiment of the invention, a light emitting module 100 includes at least one light emitting unit 110 and a light guide plate 120. The light emitting unit 110 includes a light emitting surface 112. The light emitting surface 112 includes a middle light emitting area 112A and two peripheral light emitting areas 112B. The peripheral light emitting areas 112B are disposed at opposite sides of the middle light emitting area 112A. In addition, the middle light emitting area 112A connects the peripheral light emitting areas 112B. The light emitting unit 110 emits light beams L1 and L2 from the light emitting surface 112. The light guide plate 120 includes a light incident surface 122 adjacent to the middle light emitting area 112A. A width t of the light incident surface 122 in a direction d1 is smaller than a width h of the light emitting surface 112 in the direction d1. In addition, the light incident surface 122 is configured to receive the light beam L1 emitted from the middle light emitting area 112A, and the light beam L2 from the peripheral light emitting areas 112B deviates from the light incident surface 122.

In other words, the light incident surface 122 of the light guide plate 120 of this embodiment receives the light beam L1 from the middle light emitting area 112A in a light beam L emitted by the light emitting unit 110, and does not receive the light beam L2 emitted from the peripheral light emitting areas 112B. Thus, the light beam L1 that enters the light guide plate 120 has a higher uniformity in brightness and color. More specifically, the light emitting unit 110 of this embodiment is a white light emitting diode, for example. Since the light beam L emitted by the light emitting diode is more directional, qualities of the light beam L1 emitted from the middle light emitting area 112A and the light beam L2 emitted from the peripheral light emitting areas 112B are different. Thus, by making the light guide plate 120 receive the light beam L1, the light emitting module 100 may be a more preferable light source.

Specifically, in this embodiment, the light emitting module 100 is a front light module, for example, and the light emitting unit 110 emits white light, for example. Moreover, the light emitting unit 110 further includes a blue light emitting diode 114 and a fluorescent structure 116. A yellow phosphor is provided in the fluorescent structure 116, while the blue light emitting diode 114 is configured to emit blue light. A part of the blue light transmits through the fluorescent structure 116, and a part of the blue light is absorbed by the yellow phosphor to excite the yellow phosphor and emit yellow light. The yellow light is merged with the blue light that transmits through the fluorescent structure 116 to form white light. Thus, since the light beam emitted by the light emitting diode is directional, a color temperature of the light beam L2 emitted from the peripheral light emitting areas 112B is lower than a color temperature of the light beam L1 emitted from the middle light emitting area 112A. Thus, since the light guide plate 120 of this embodiment receives the light beam L1 with a higher color temperature, a preferable light source may be provided.

It should be particularly noted that in this embodiment of the invention, the light emitting unit 110 is a light emitting diode, for example. However, the invention is not limited thereto. In other embodiments, the light emitting unit may also be an organic light emitting diode (OLED), a laser diode (LD), or other suitable light emitting units. Besides, the light emitting unit 110 is a linear light source, for example. Namely, the light emitting unit 110 is a light bar formed of light emitting diodes. However, the invention is not limited thereto. In other embodiments, the light emitting unit may also be a plurality of light emitting diodes arranged into an array or a plurality of point light sources.

Referring to FIGS. 1A and 1B, in the first embodiment of the invention, the light emitting surface 112 exceeds the light incident surface 122 in the direction d1. Since the light beam L2 emitted from the peripheral light emitting areas 112B deviates from the light incident surface 122, the light incident surface 122 does not receive the light beam L2. The widths of the light emitting surface 112 and the light incident surface 122 meets $$1.1 \leq \frac{h}{t} \leq 2.5$$

in the direction d1, where h is the width of the light emitting surface 112 in the direction d1, and t is the width of the light incident surface 122 in the direction d1. Since the light emitting unit 110 and the light guide plate 120 of the light emitting module 100 of this embodiment are in a configuration as described above, the light guide plate 120 is able to receive the uniform light beam L1.

In other words, in this embodiment, the middle light emitting area 112A of the light emitting unit 110 has a width h1 in the direction d1, and the width t of the light incident surface 122 of the light guide plate 120 is smaller than or equal to the width h1 and is right opposite to a part of the middle light emitting area 112A. In other words, the light guide plate 120 of this embodiment receives the light beam L1 having a uniform color temperature provided by the middle light emitting area 112A close to the middle on the light emitting surface 112 by using the light incident surface 122. In addition, since the middle light emitting area 112A and the light emitting surface 112 are in a configuration as described above, the light emitting module 100 of this embodiment may serve as a preferable light source.

In the following, other embodiments are provided for further description. It should be noted that the reference numerals and a part of the contents in the previous embodiment are used in the following embodiments, in which identical reference numerals indicate identical or similar components, and repeated description of the same technical contents is omitted. For a detailed description of the omitted parts, reference can be found in the previous embodiment, and no repeated description is contained in the following embodiments.

Figure 2:
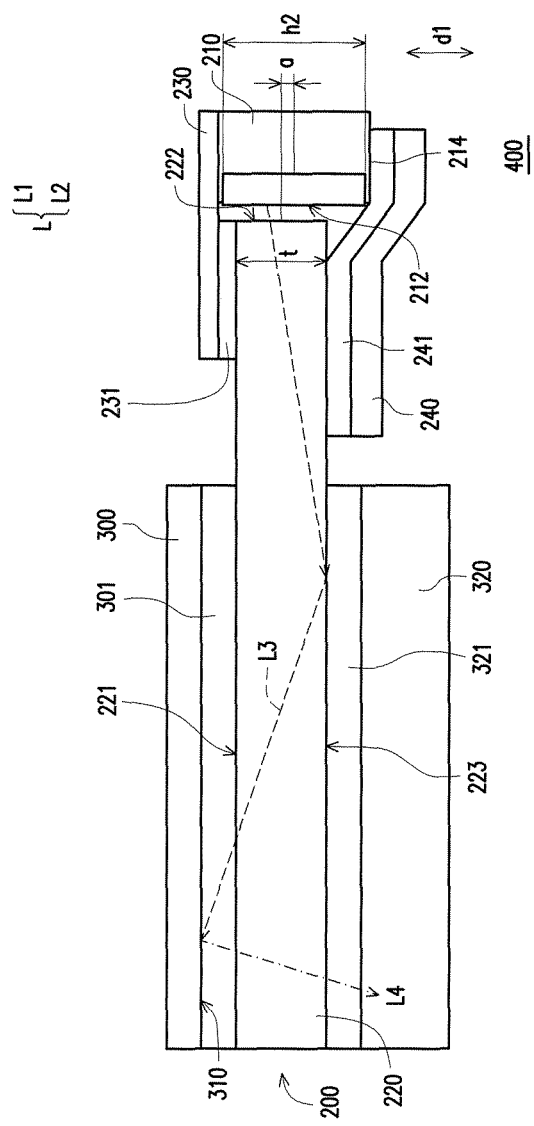
FIG. 2 is a schematic view illustrating a display device according to a second embodiment of the invention.

FIG. 2 is a schematic view illustrating a display device according to a second embodiment of the invention. Referring FIG. 2, in the second embodiment of the invention, a display device 400 includes a display panel 300 and a light emitting module 200. The display panel 300 includes a display surface 310. In addition, the light emitting module 200 is disposed beside the display surface 310. The light emitting module 200 of this embodiment is similar to the light emitting module 100 described above, except for a difference that the light emitting module 200 further includes a flexible printed circuit (FPC) board 230 and a light shielding layer 240.

In this embodiment, the flexible printed circuit board 230 is electrically connected with a light emitting unit 210. The light emitting unit 210 includes a light emitting surface 212. A light guide plate 220 further includes a first surface 221 and a second surface 223. A light incident surface 222 connects the first surface 221 and the second surface 223. The flexible printed circuit board 230 is connected to a part of the first surface 221 through an adhesive layer 231.

The light emitting unit 210 has a third surface 214 connected to the light emitting surface 212 adjacent to the second surface 223 in the direction d1. The light shielding layer 240 is adhered to a part of the second surface 223 and the third surface 214 through another adhesive layer 241. In addition, a part of the light guide plate 220 is located between the light shielding layer 240 and the flexible printed circuit board 230. In this embodiment, the light shielding layer 240 is a light shielding tape, for example, for absorbing a redundant and undesired light beam. In a preferred embodiment of the invention, a light absorption ratio of the light shielding tape is in a range of 5% to 100%, for example. In other words, in this embodiment, by using the adhesive layers 231, 241, the flexible printed circuit board 230, and the light shielding layer 240, the light emitting unit 210 may be disposed at a suitable position to make a light beam L3 from a middle light emitting area of the light emitting surface 212 enter the light guide plate 220. Referring to FIG. 2, in this embodiment, the first surface 221 of the light guide plate 220 is connected to the display panel 300 through a transparent adhesive layer 301, and the second surface 223 is connected to a protective layer 320 through a transparent adhesive layer 321. Besides, a microstructure may be further disposed on the first surface 221 or the second surface 223. The microstructure may reflect or refract the light beam entering the light guide plate 220 to the display panel 300. However, the connection between the light guide plate and the display panel of the invention is not limited thereto. In other embodiments of the invention, based on practical needs, other functional components such as a touch panel may also be disposed above or below the light guide plate. In addition, the light guide plate and other functional components may be connected through a transparent adhesive layer or an air layer.

Specifically, an interval a is between a middle point of the light emitting surface 212 in the direction d1 and a middle point of the light incident surface 222 in the direction d1. In addition, the interval a is smaller than or equal to (h2−t)/2, where h2 is a width of the light emitting surface 212 in the direction d1, and t is the width of the light incident surface in the direction d1. In other words, to be adjusted according to an overall mechanical configuration of the display device 400, the light emitting module 200 according to the embodiment of the invention may use a thinner light guide plate 220 to adjust the position of the light guide plate 220 with respect to the light emitting unit 210 in the direction d1, and the position is not limited to be aligned right to the center.

Besides, the light shielding layer 240 may absorb an undesired light beam, so as to prevent the undesired light beam from entering the light guide plate 220. Thus, the light emitting module 200 of this embodiment may provide the light beam L3 from the light emitting unit 210 and transmit the light beam L3 to the display surface 310 of the display surface 300 through the light guide plate 220. The light beam L3 is then reflected by the display surface 310 to form an image light beam L4 for the user's viewing. In this way, the user is allowed to view a preferable image. In this embodiment, the display panel 300 is a liquid crystal display (LCD) panel, for example. However, the invention is not limited thereto. In other embodiments, the display panel may also be an electrophoretic display panel or other reflective display panels.

It should be noted in particular that, in this embodiment, the light emitting unit of the light emitting module are disposed at the same side of the light guide plate. However, the invention is not limited thereto. In other embodiments, based on a size and a shape of the light guide plate and a brightness requirement, the light emitting unit may disposed on different sides of the light guide plate.

In view of the foregoing, in the light emitting module according to the embodiments of the invention, the light incident surface of the light guide plate is disposed in correspondence with the middle light emitting area of the light emitting unit. Thus, by receiving the light beam emitted from the middle light emitting area of the light emitting unit, the light beams entering the light emitting module are similar in color and brightness. Thus, the light beam provided by the light emitting module as the light source may also have a more uniform color and brightness. Thus, the light emitting module may serve as a preferable light source. With the light emitting module, the display device provided in the embodiments of the invention may use the preferable light source to irradiate the display surface of the display panel, thereby providing a preferable image.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:
1. A light emitting module, comprising:
 a light emitting unit, comprising a light emitting surface comprising a middle light emitting area and two peripheral light emitting areas, wherein the two peripheral light emitting areas are disposed at opposite sides of the middle light emitting area, and the light emitting unit emits a light beam from the light emitting surface;
 a light guide plate, comprising a light incident surface adjacent to the middle light emitting area, wherein a width of the light incident surface in a direction is smaller than a width of the light emitting surface in the direction, the light incident surface receives a part of the light beam emitted from the middle light emitting area, and another part of the light beam emitted from the two peripheral light emitting areas deviates from the light incident surface; and a flexible printed circuit board electrically connected to the light emitting unit, wherein the light guide plate further comprises a first surface and a second surface, the light incident surface connects the first surface and the second surface, and the flexible printed circuit board is connected to a part of the first surface through an adhesive layer.

2. The light emitting module as claimed in claim 1, wherein the widths of the light emitting surface and the light incident surface in the direction meet $$1.1 \leq \frac{h}{t} \leq 2.5,$$

wherein h is the width of the light emitting surface in the direction, and t is the width of the light incident surface in the direction.

3. The light emitting module as claimed in claim 1, wherein an interval is between a middle point of the light emitting surface in the direction and a middle point of the light incident surface in the direction, and the interval is smaller than or equal to (h−t)/2, where h is the width of the light emitting surface in the direction, and t is the width of the light incident surface in the direction.

4. The light emitting module as claimed in claim 1, further comprising a light shielding layer, wherein the light emitting unit has a third surface connected to the light emitting surface adjacent to the second surface in the direction, the light shielding layer is adhered to a part of the second surface and the third surface through another adhesive layer, and a part of the light guide plate is located between the light shielding layer and the flexible printed circuit board.

5. The light emitting module as claimed in claim 1, wherein the light emitting module is a front light module.

6. A display device, comprising:
 a display panel, comprising a display surface; and
 a light emitting module, disposed beside the display surface, wherein the light emitting module comprises:
 a light emitting unit, comprising a light emitting surface comprising a middle light emitting area and two peripheral light emitting areas, wherein the two peripheral light emitting areas are disposed at opposite sides of the middle light emitting area, and the light emitting unit emits a light beam from the light emitting surface;
 a light guide plate, comprising a light incident surface adjacent to the middle light emitting area, wherein a width of the light incident surface in a direction is smaller than a width of the light emitting surface in the direction, the light incident surface receives a part of the light beam emitted from the middle light emitting area, and another part of the light beam emitted from the two peripheral light emitting areas deviates from the light incident surface; and
 a flexible printed circuit board electrically connected to the light emitting unit, wherein the light guide plate further comprises a first surface and a second surface, the light incident surface connects the first surface and the second surface, and the flexible printed circuit board is connected to a part of the first surface through an adhesive layer.

7. The display device as claimed in claim 6, wherein the widths of the light emitting surface and the light incident surface in the direction meets:

$$1.1 \leq \frac{h}{t} \leq 2.5,$$

wherein h is the width of the light emitting surface in the direction, and t is the width of the light incident surface in the direction.

8. The display device as claimed in claim 6, wherein an interval is between a middle point of the light emitting surface in the direction and a middle point of the light incident surface in the direction, and the interval is smaller than or equal to (h−t)/2, where h is the width of the light emitting surface in the direction, and t is the width of the light incident surface in the direction.

9. The display device as claimed in claim 6, further comprising a light shielding layer, wherein the light emitting unit has a third surface connected to the light emitting surface adjacent to the second surface in the direction, the light shielding layer is adhered to a part of the second surface and the third surface through another adhesive layer, and a part of the light guide plate is located between the light shielding layer and the flexible printed circuit board.

\* \* \* \* \*